US011323494B1

(12) United States Patent
Olsen et al.

(10) Patent No.: US 11,323,494 B1
(45) Date of Patent: *May 3, 2022

(54) SYSTEMS AND METHODS FOR SELF-ORGANIZING MULTICAST

(71) Applicant: Ivanti, Inc., South Jordan, UT (US)

(72) Inventors: Gregory Paul Olsen, Lindon, UT (US); Blake Alan Thompson, Saratoga Springs, UT (US)

(73) Assignee: Ivanti, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,269

(22) Filed: Nov. 9, 2020

Related U.S. Application Data

(63) Continuation of application No. 14/583,531, filed on Dec. 26, 2014, now Pat. No. 10,834,150.

(51) Int. Cl.
  *H04L 65/401* (2022.01)
  *H04L 65/60* (2022.01)
  *H04L 12/18* (2006.01)
(52) U.S. Cl.
  CPC .......... *H04L 65/4023* (2013.01); *H04L 12/18* (2013.01); *H04L 65/60* (2013.01)

(58) Field of Classification Search
  CPC ...... H04L 65/4023; H04L 12/18; H04L 65/60
  See application file for complete search history.

(56) References Cited

U.S. PATENT DOCUMENTS

| 6,791,981 | B1* | 9/2004 | Novaes | H04L 12/18 370/390 |
| 9,137,780 | B1* | 9/2015 | Olsen | G06F 3/0659 |
| 10,834,150 | B1* | 11/2020 | Olsen | H04L 12/18 |
| 2003/0187931 | A1* | 10/2003 | Olsen | H04L 29/06 709/205 |
| 2004/0107242 | A1* | 6/2004 | Vert | H04L 67/104 709/203 |
| 2006/0048144 | A1* | 3/2006 | Willess | H04L 67/34 717/177 |

* cited by examiner

*Primary Examiner* — Tonia L Dollinger
*Assistant Examiner* — Jihad K Boustany

(57) ABSTRACT

A method for file downloading by a computing device is described. The method includes sending a multicast representative message on a multicast channel in response to receiving file download instructions. The multicast representative message indicates that the computing device is a multicast representative. The method also includes downloading file data during a multicast delay. The method additionally includes sending the file data on the multicast channel upon expiration of the multicast delay. The method further includes sending a multicast complete message.

16 Claims, 10 Drawing Sheets

SYSTEMS AND METHODS FOR SELF-ORGANIZING MULTICAST

CROSS-REFERENCE TO RELATED APPLICATION

This application is a continuation of U.S. patent application Ser. No. 14/583,531, filed Dec. 26, 2014, which is incorporated herein by reference in its entirety.

TECHNICAL FIELD

The present disclosure generally relates to computers and computer-related technology. More specifically, the present disclosure relates to systems and methods for downloading information to computing devices using self-organizing multicast.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with networks is that it is difficult to that ensure that a wide variety of information has been uniformly downloaded to computing devices on a computer network under contemporary practices. Additionally, current methods of ensuring that a wide variety of information has been uniformly downloaded by computing devices on a computer network may burden a network and may be time intensive. As can be observed from this discussion, systems and methods that make uniformly downloading information to computing devices more time efficient and less burdensome may be beneficial to the management of a computer network.

DETAILED DESCRIPTION

Figure 1:
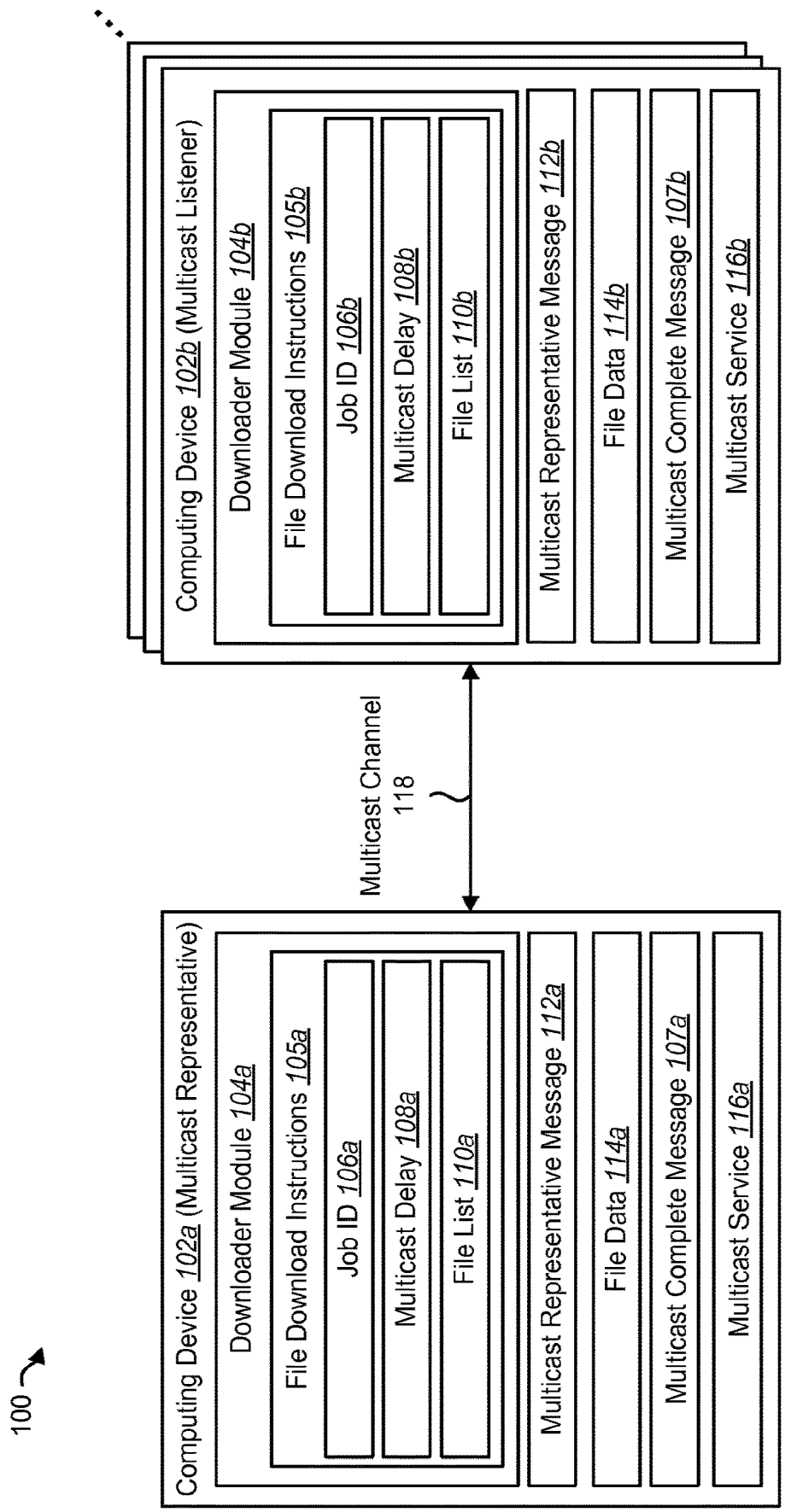
FIG. 1 is a block diagram illustrating one configuration of a network for self-organizing multicast.

A method for file downloading by a computing device is described. The method includes sending a multicast representative message on a multicast channel in response to receiving file download instructions. The multicast representative message indicates that the computing device is a multicast representative. The method also includes downloading file data during a multicast delay. The method further includes sending the file data on the multicast channel upon expiration of the multicast delay. The method additionally includes sending a multicast complete message.

Receiving file download instructions may include receiving a file list for a file download job. Receiving file download instructions may also include receiving a unique job ID for the file download job. Receiving file download instructions may further include receiving the multicast delay.

The file download instructions may be received by one or more computing devices on multiple subnets. A computing device on each subnet manages a self-organizing multicast session for that subnet.

The multicast representative message may be sent in response to receiving the file download instructions. A first computing device to send the multicast representative message may become the multicast representative.

The multicast delay may be a period of time that is long enough to allow all computing devices on a subnet to receive the file download instructions before the multicast representative sends the file data on the multicast channel.

A computing device configured for file downloading is also described. The computing device includes a processor, memory in electronic communication with the processor, and instructions stored in the memory. The instructions are executable by the processor to send a multicast representative message on a multicast channel in response to receiving file download instructions. The multicast representative message indicates that the computing device is a multicast representative. The instructions are also executable to download file data during a multicast delay. The instructions are further executable to send the file data on the multicast channel upon expiration of the multicast delay. The instructions are additionally executable to send a multicast complete message.

A method for file downloading by a computing device is also described. The method includes receiving file download instructions. The method also includes receiving a multicast representative message on a multicast channel. The multicast representative message indicates that another computing device is a multicast representative. The method further includes receiving file data from the multicast representative on the multicast channel upon expiration of a multicast delay.

The method may also include sending a multicast representative message on the multicast channel after a multicast complete message is not received. The multicast representative message may indicate that the computing device is a multicast representative. The method may further include downloading missing file data. The method may additionally include sending the missing file data on the multicast channel upon expiration of the multicast delay. The method may also include sending a multicast complete message.

Upon receiving a multicast complete message, the method may include analyzing the received file data for content. The method may also include determining whether file data is missing from a file list contained in the file download instructions. The method may additionally include obtaining missing file data based on preference order of a peer, a preferred server and a source.

A computing device configured for file downloading is also described. The computing device includes a processor, memory in electronic communication with the processor, and instructions stored in the memory. The instructions are executable by the processor to receive file download instructions. The instructions are also executable to receive a multicast representative message on a multicast channel. The multicast representative message indicates that another computing device is a multicast representative. The instructions are further executable to receive file data from the multicast representative on the multicast channel upon expiration of a multicast delay.

There is often a need to distribute data to computing devices in a network. For example, a computing device may be instructed to download a file from a peer. As used herein, the term "peers" refers to computing devices (e.g., nodes) that are connected to a network and can exchange information (e.g., data, files, messages) directly with each other. In one configuration, a computing device may attempt to download a file from a peer through multicasting. Multicasting refers to a communication technique where a single computing device may send the same data to many (or even all) computing devices on a network.

In some configurations, multicast and peer download functionality may utilize two-way communication on a multicast channel. For example, when a computing device is instructed to download a file from a peer, the computing device may send a multicast request message on the multicast channel and any peers on that subnet that have the file may reply on the multicast channel by sending a multicast reply message. It should be noted that the reply is also sent as a multicast message (rather than point-to-point) so that all peers will see each other's replies and can decide if they still need to reply based on the replies of other peers. One approach to multicast distribution involves the use of a server that orchestrates and controls the multicast between the computing devices on a network. A server may also be referred to also as a core server or central server. The server may direct one or more processes involved in multicast distribution.

Problems may arise with multicasts that are controlled by a server. The server may become disconnected from the multicasting computing devices resulting in a failure of software distribution. The connection between the server and the multicasting computing devices may result in a burden on the computer network. The server may not be able to communicate appropriately with computing devices on different subnets and may not be able to communicate past a network address translator (NAT).

As can be demonstrated from this discussion, there is a need for systems and methods for self-organizing multicasts. The described systems and methods describe multicast method that may enable a computer network to get the benefits of multicast downloading without the pain and cost of controlling the multicast session on each subnet from a server. The systems and methods described may alleviate the burden placed on a computer network during a multicasting, and may eliminate the need to communicate past a network address translator (NAT). Aspects of the present disclosure will be described in relation to a computing network that includes various components for managing computing devices belonging to an enterprise and components that cross multiple enterprises.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a network 100 for self-organizing multicast. The network 100 may include multiple computing devices 102a-b. The computing devices 102a-b may be in electronic communication with one or more other computing devices 102a-b via a multicast channel 118. The computing devices 102a-b may be desktop computers, laptop computers, tablet computers, etc. Communication via the multicast channel 118 may occur over a network. The network may include one or more Local Area Networks (LANs), Wide Area Networks (WANs), Wireless Local Area Networks (WLANs), the Internet, etc.

The computing devices 102a-b may include a multicast service 116a-b. A computing device 102 may perform multicast operations via the multicast service 116. For example, the multicast service 116 may send and receive multicast information over the multicast channel 118.

The computing devices 102a-b may also include a downloader module 104a-b. The downloader module 104a-b may perform file download operations. The downloader module 104a-b may download files from peers, preferred servers or an original source. As used herein, a preferred server may be a defined network storage location. For example, the preferred server may be a network attached storage (NAS) location or a full server that is always on and generally available. The preferred server is such that the downloader module 104a-b would know about the preferred server and choose to utilize the preferred server instead of the original source, due to the preferred server being closer on the network 100 or faster to access.

The downloader module 104a-b may implement a priority downloading process. The priority of the file sources may be programmed in a specific order or may be determined by the computing device 102a-b for each software distribution job. The priority determination may be based on the most efficient path to obtain the files included in a software distribution job or may be based on devices that are more likely to include the files.

In one example of a priority downloading process, a downloader module 104 may be configured to obtain files from a peer. If the downloader module 104 fails to obtain the files from the peer, then the downloader module 104 may attempt to obtain the files from a preferred server. If the downloader module 104 fails to obtain the files from the preferred server, the downloader module 104 may attempt to obtain the files from an original source.

The downloader modules 104a-b may also download files using multicast operations. A downloader module 104 may communicate with the multicast service 116 within a computing device 102. The multicast service 116 may communicate with other multicast services 116 located on other computing devices 102 over the multicast channel 118.

During multicast, one computing device 102 may distribute file data 114 to one or more other computing devices 102 over a multicast channel 118. In one approach to multicast, a server may orchestrate and control the multicast between the computing devices 102 on a network 100 (e.g., computer network). However, problems may arise with multicasts that are controlled by a server. The server may become disconnected from the multicasting computing devices 102a-b, resulting in a failure of software distribution. The connection between the server and the multicasting computing devices 102a-b may also result in a burden on the network 100. Furthermore, the server may not be able to communicate appropriately with computing devices 102a-b on different subnets.

In another approach, computing devices 102a-b may perform self-organizing multicast that may allow the benefits of multicast communication without the cost of controlling a multicast session on each subnet within a network 100 from a server or another device. For a file download job, the computing devices 102a-b may receive file download instructions 105. The file downloader instructions 105 may be received by one or more computing devices 102a-b on multiple subnets and a computing device 102 on each subnet manages a self-organizing multicast session on that subnet.

The downloader module 104a-b may perform multicast operations based on file download instructions 105a-b. The file download instructions 105a-b may be received from a server or other source. Each of the computing devices 102a-b may receive the same file download instructions 105a-b.

The file download instructions 105a-b may include a job ID 106a-b, a file list 110a-b and a multicast delay 108a-b. The job ID 106a-b may be a unique identifier for a particular file download job. The job ID 106a-b may indicate what file download job the multicast is to perform and what computing devices 102a-b are to be a part of that file download job. For example, a job ID 106a-b may indicate that the computing devices 102a-b are instructed to join a multicast to download certain files. Furthermore, the job ID 106a-b may be used to communicate which file download job the computing devices 102a-b are performing.

The file list 110a-b may include a list of the files that are to be downloaded for the file download job. The file list 110a-b may also include instructions for downloading files onto the computing devices 102a-b. For example, the file list 110a-b may include instructions indicating which files to download, what order to download files and information to verify that previously downloaded files are the correct version. The files to be downloaded during a file download job may include program files, personal files, software updates, etc.

The multicast delay 108a-b may be a period of time the computing devices 102a-b should wait before initiating the file download or file broadcast via the multicast channel 118. The multicast delay 108a-b may be based on how many computing devices 102a-b are participating in the multicast session. For example, a longer multicast delay 108a-b may be used when a large number of computing devices 102a-b are downloading files via the multicast session, or a shorter multicast delay 108a-b may be used when a small number of computing devices 102a-b participate in the multicast session. The multicast delay 108a-b may be a period of time that is long enough to allow the computing devices 102a-b on a subnet to receive file download instructions 105 before file data 114a is sent over the multicast channel 118.

A longer multicast delay 108a-b may ensure that all the computing devices 102a-b have joined the multicast session before the computing device 102a designated as the multicast representative begins to send files to be downloaded. The multicast delay 108a-b may alternatively be programmable by auser.

When the computing device 102a obtains the file download instructions 105a, the computing device 102a may use the multicast channel 118 to send a multicast representative message 112a to the other computing devices 102b in the network. The multicast representative message 112a may verify if any of the other computing devices 102b have been designated a multicast representative. If the other computing devices 102b have not been designated the multicast representative, the computing device 102a may be designated as the multicast representative. The other computing devices 102b may be designated as multicast listeners. It should be noted that the first computing device 102 to send a multicast representative message 112 in response to receiving the file download instructions 105 may become the multicast representative. The other computing devices 102 may become multicast listeners. Therefore, a computing device 102 may be designated as either a multicast representative or a multicast listener based on when the computing device 102 responds to the file download instructions 105. In the example illustrated in FIG. 1, the computing device 102a may be the first computing device 102 to send a multicast representative message 112. Therefore, the computing device 102a may become the multicast representative.

The multicast representative may direct the multicast in place of a server or other electronic devices. The computing device 102a designated as the multicast representative may download the file data 114a. The file download may occur during the multicast delay (as indicated by the multicast delay 108a). The file data 114a may be all the files in the file list 110a that are to be downloaded by the computing devices 102a-b participating in the multicast session. The multicast service 116a-b may be a means for the computing device 102a designated as a multicast representative and the other computing devices 102b designated as multicast listeners to access the multicast session and download files that are being sent by the computing device 102a designated as the multicast representative. The multicast service 116a-b may also enable the computing devices 102a-b to send or receive the multicast representative message 112a-b that indicates which computing device 102a is acting as the multicast representative.

If the computing device 102a designated as multicast representative stops communicating, the computing device 102b designated as the multicast listener may attempt to download the files from other devices. In one configuration, the computing device 102b may attempt to download the files first from a peer source, a server source and then an original source. In another configuration, if the computing device 102a stops communicating, the computing device 102b designated as a multicast listener may become the multicast representative. The computing device 102b may request the rest of the files in the file list 110b from a server or another source. The computing device 102b may send a multicast representative message 112b to other devices on the network 100. The computing device 102b may then complete the download job.

Once all of the computing devices 102a-b have downloaded the files in the file list 110, the computing devices 102a-b may send a multicast complete message 107a-b. The multicast complete message 107 may indicate that the multicast session is complete and that the computing devices 102 may end the multicast session.

Allowing multicast to be organized and performed by a computing device 102 may improve the efficiency and strain of traditional multicast on a network. It may also eliminate the risk of a remote server losing communication with other computing devices 102 and causing the multicast process to be incomplete. The methods and systems disclosed herein would allow the files to be downloaded by a single computing device 102 and then sent to any other computing devices 102 that are participating in a particular software distribution job.

Allowing multicast to be organized and performed by a computing device 102 may improve the efficiency of a multicast process by eliminating the need to partition a download job for multiple subnets. This is due to the fact that multicast traffic does not traverse routers and is specific to a single subnet. In a server-based approach, the server must determine all the subnets involved in the download job and partition the download job for each subnet. The self-organizing multicast described herein may automatically segment by subnet since all of the computing devices 102a-b participating in the download job negotiate to be the multicast representative. Furthermore, the participating computing devices 102a-b will only hear multicast traffic on the subnet that the computing devices 102a-b are part of.

Figure 2:
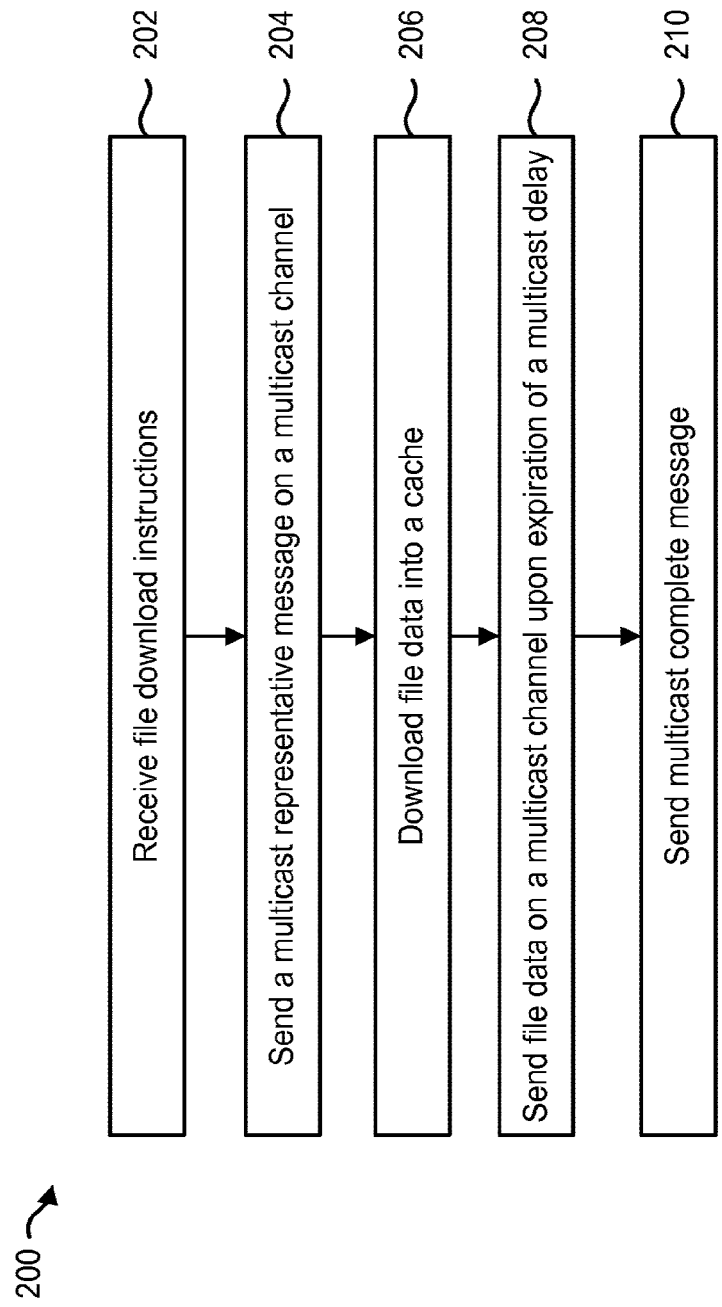
FIG. 2 is a flow diagram illustrating a method for file downloading via self-organizing multicast by a computing device.

FIG. 2 is a flow diagram illustrating a method 200 for file downloading via self-organizing multicast by a computing device 102a. The method 200 may be performed by a computing device 102a designated as a multicast representative. The computing device 102a designated as the multicast representative may be in electronic communication with one or more computing devices 102b designated as multicast listeners. The method 200 may facilitate file downloading by using self-organizing multicast.

The computing device 102a may receive 202 file download instructions 105a. The file download instructions 105a may be received from a server that manages computing devices 102a-b on a particular computer network, or may be received from a web portal that is accessed by the computing devices 102a-b, etc. The file download instructions 105a may include a unique job ID 106a for this particular file download job. The file download instructions 105a may also indicate which files to download, what order to download files or information to verify previously downloaded files are the correct version. The file download instructions 105a may also include a file list 110a that are to be downloaded during a specific multicast. The files to be downloaded during a multicast may include program files, personal files, software updates, etc. The file download instructions 105a may additionally include a multicast delay 108a that indicates a period of time that the computing device 102a should wait before initiating the file download or file broadcast via the multicast channel 118.

The computing device 102a may send 204 a multicast representative message 112a on a multicast channel 118. If the computing device 102a is the first device to send the multicast representative message 112a, the computing device 102a will not receive a reply from the other computing devices 102b. If no reply is received, the computing device 102a may be designated as a multicast representative. In other words, the first computing device 102a that sends the multicast representative message 112a may become the multicast representative for the file download job.

Once the computing device 102a is designated as the multicast representative, the computing device 102a may download 206 file data 114a. For example, the computing device 102a may download 206 file data 114a into a cache. The file data 114a may be the files contained in the file list 110a.

The computing device 102a may send 208 the file data 114a on the multicast channel 118 upon the expiration of a multicast delay 108a. The multicast delay 108a may be a period of time used to enable all computing devices 102b designated as multicast listeners to join the multicast and prepare to download the file data 114a via the multicast channel 118.

The computing device 102a (i.e., the multicast representative) may send 210a multicast complete message to the other computing devices 102b (i.e., the multicast listeners). The multicast complete message 107 may indicate that all of the files in the file list 110 have been sent by the computing device 102a, and that the computing devices 102a-b may disconnect from the multicast session.

Figure 3:
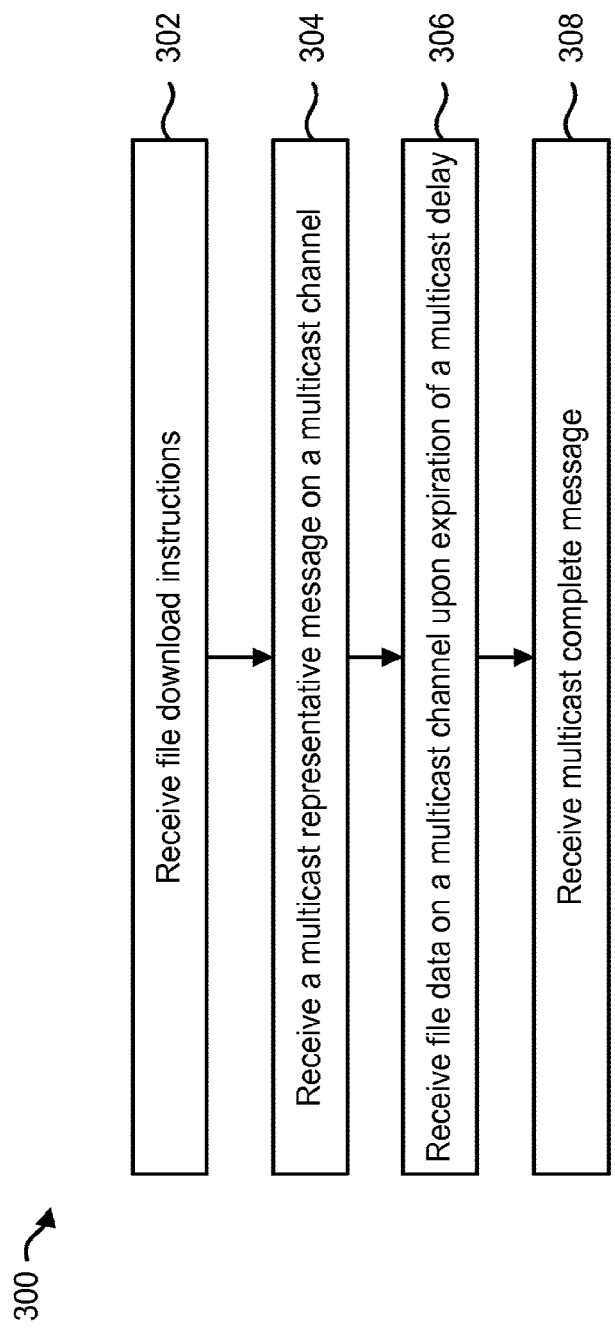
FIG. 3 is a flow diagram illustrating yet another method for file downloading via self-organizing multicast by a computing device.

FIG. 3 is a flow diagram illustrating yet another method 300 for file downloading via self-organizing multicast by a computing device 102b. The computing device 102b may be in electronic communication with one or more other computing devices 102a.

The computing device 102b may receive 302 file download instructions 105b. As described above, the file download instructions 105b may be received from a server that manages computing devices 102a-b on a particular computer network, or may be received from a web portal that is accessed by the computing devices 102a-b, etc. The file download instructions 105b may include a job ID 106a, a file list 110a and a multicast delay 108a.

The computing device 102b may receive 304 a multicast representative message 112b on a multicast channel 118. A computing device 102a designated as the multicast representative may send the multicast representative message 112a as discussed in FIG. 2. The computing device 102b may determine that the other computing device 102a was the first to send the multicast representative message 112b in response to receiving the file download instructions 105b. The computing device 102b may be designated as a multicast listener. The computing device 102b may wait to receive files from the computing device 102a designated as the multicast representative.

The computing device 102b may receive 306 file data 114b on the multicast channel 118 upon expiration of a multicast delay 108b. The computing device 102a designated as the multicast representative may send file data 114a on the multicast channel 118 upon the expiration of a multicast delay 108a. The multicast delay 108a may be a period of time used to enable all computing devices 102b designated as multicast listeners to join the multicast and prepare to download file data 114a via the multicast channel 118.

The computing device 102b may receive 308 a multicast complete message 107b. The computing device 102a designated as the multicast representative may send a multicast complete message 107a and the computing devices 102b designated as multicast listeners may receive 308 the multicast complete message 107b. The multicast complete message 107b may indicate that all of the files in the file list 110 have been sent by the computing device 102a, and that the computing devices 102a-b may disconnect from the multicast session.

Figure 4:
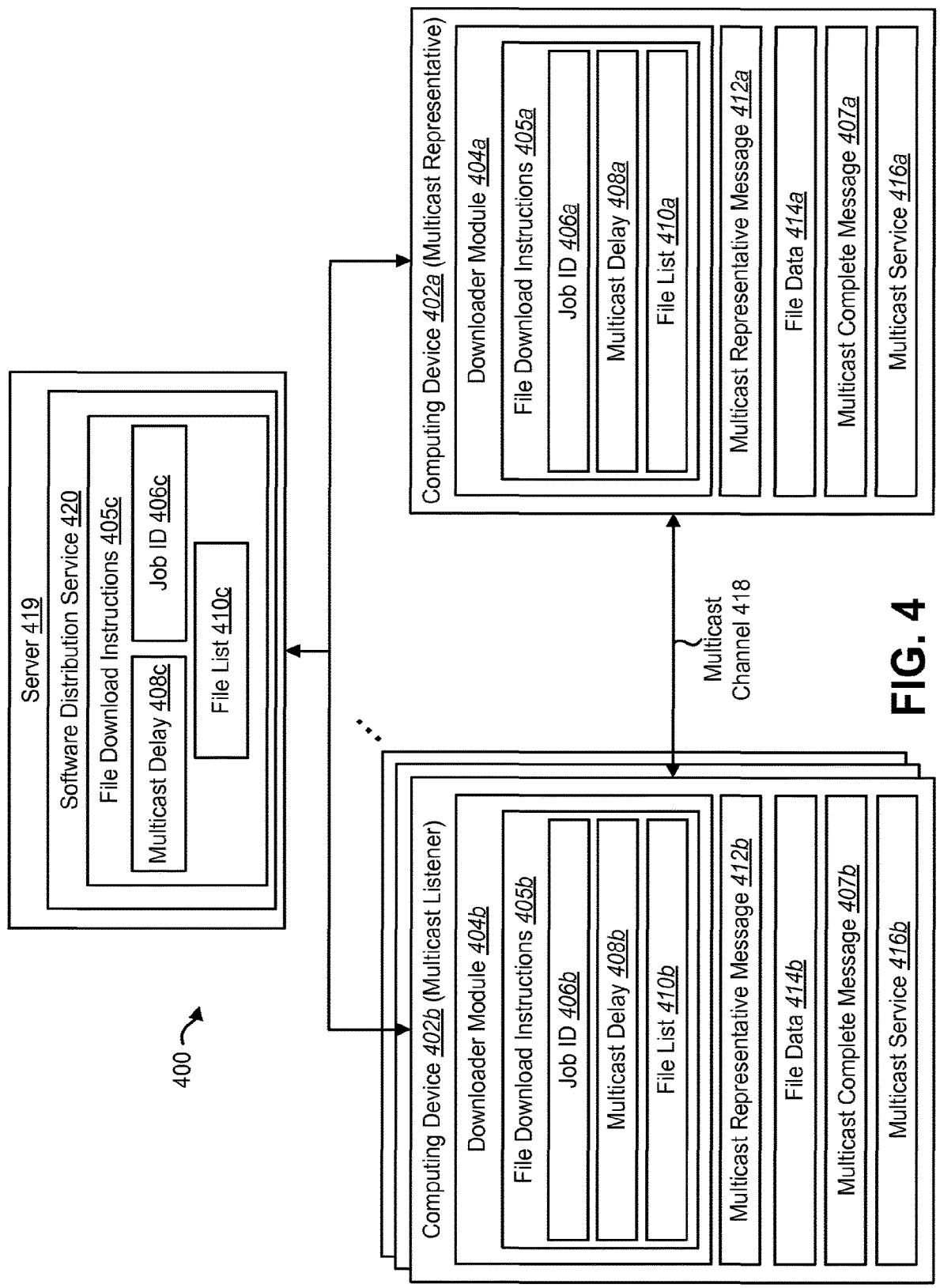
FIG. 4 is a block diagram illustrating another configuration of a system for self-organizing multicast.

FIG. 4 is a block diagram illustrating another configuration of a system 400 for self-organizing multicast. The system 400 may include multiple computing devices 402a-b (a multicast representative and one or more multicast listeners) and a server 419. The server 419 may manage the computing devices 402a-b and any other device located within the system 400. The server 419 may be a peer, preferred server, an original source server, a network drive, an Internet address, etc.

The server 419 may include a software distribution service 420. The software distribution service 420 may be used to perform the distribution of files and other resources that are to be downloaded by the computing devices 402a-b as part of a software distribution job. The server 419 may provide the computing devices 402a-b with file download instructions 405c that include one or more of a job ID 406c, a multicast delay 408c and file list 410c. The job ID 406c may be a globally unique identifier (GUID) that ensures the computing devices 402a-b and the server 419 are downloading and sending the correct files. The file list 410c may be the list of files to be downloaded for the job ID 406c.

The multicast delay 408c may indicate a length of time the computing devices 402a-b are to wait before starting the multicast process. The multicast delay 408c may be used to allow all the computing devices 402a-b to join the multicast before a multicast session starts for the software distribution job. The multicast delay 408 may be determined by the server 419 to be short if there is a small number of computing devices 402 participating in the software distribution job. The multicast delay 408 may alternatively be programmable by a user.

The computing devices 402a-b within the system 400 may include a downloader module 404a-b and a multicast service 416a-b. The downloader module 404a-b may receive file download instructions 405a-b. The file download instructions 105a-b may include the file list 410a-b, the job ID 406a-b and the multicast delay 408a-b sent by the server 419.

The computing devices 402a-b may use the job ID 406a-b to ensure they are to be part of the software distribution job and indicate what software distribution job the computing devices 402a-b are to join. For example, a job ID 406a-b may be sent to each of the computing devices 402 as a way to indicate that the computing devices are instructed to join a multicast to download certain files.

When the computing device 402a obtains the file list 410a, the computing device 402a may use the multicast channel 418 to send a multicast representative message 412a to the other computing devices 402b within the network. The multicast representative message 412a may verify if the other computing devices 402b have been designated as the multicast representative. If the other computing devices 402b have not been designated as the multicast representative, the computing device 402a may be designated as the multicast representative. The other computing devices 402b may be designated as multicast listeners. The multicast representative may direct the multicast in place of a server 419 or other electronic devices.

In one configuration, the computing devices 402a-b may have the ability to automatically select only one computing device 402 on a subnet to be the multicast representative. On a first computing device 402a, an instance of a downloader dynamic link library (DLL) (e.g., the downloader module 404a) is loaded and told about the group of files to be downloaded (e.g., the file download job) and told to use multicast. The downloader module 404a is supplied a job ID 406a (e.g., GUID). The downloader DLL asks the multicast service 416a (that is always listening on the multicast channel 418 for messages from other clients) if it should act as the subnet multicast representative for this file download job.

Since this is the first computing device 402 on the subnet that becomes aware of the file download job, the multicast service 416a has not heard of the job ID 406 yet. Therefore, there is not an entry in its table of active multicasts for this job ID 406. The multicast service 416a creates an entry in the table and sets its state to discovery. The multicast service 416a then sends a message (e.g., multicast representative message 412a) out the multicast channel 418 asking if any other computing device 402b is acting as multicast representative for the file download job.

Any other computing devices 402b on the subnet that receive this multicast representative message 412a will create an entry in their active multicast table showing a state of unknown (or inactive) because this is the first they have heard of the job ID 406. The other computing devices 402b have not yet been told by their downloader DLL that they are interested in this job ID 406 yet.

If there is no reply for a certain timeout period, this first computing device 402a will assume it is chosen and change its state in the table to chosen-as-rep. If this first computing device 402a sees any requests asking who is chosen as multicast representative for the file download job, it will reply.

If this first computing device 402a sees a reply (e.g., multicast representative message 412b) from another computing device 402b (e.g., a second computing device 402b), that also thinks it is selected as the multicast representative, the first computing device 402a will compare the multicast service GUID in the multicast representative message 412b from the second computing device 402b with its own multicast service GUID and decide which is greater. It is decided ahead of time that the GUID that is greater will continue being the multicast representative. If the service GUID in the request from the second computing device 402b is greater, then the first computing device 402a will update its state to be not-chosen and will no longer reply to the who-is-rep request.

On a second computing device 402b (e.g., a second computing device 402b to become aware of a file download job), an instance of the downloader DLL (e.g., downloader module 404b) is loaded and told about the group of files to be downloaded (the file download job) and told to use multicast. The downloader DLL is supplied a job ID 406b (e.g., GUID).

The downloader DLL asks the multicast service 416b (that is always listening on the multicast channel 418 for messages from other clients) if it is the subnet multicast representative for this file download job.

Because this is the second computing device 402b to become aware of the file download job, there is already a structure in the table of active multicasts for this job ID 406b. Therefore, the second computing device 402b knows it is not selected because the table entry was already there. The second computing device 402b may changes its state from Unknown to Not-Chosen and can immediately tell the downloader module 404b it is not selected.

There may be a timestamp of when the multicast service 416 last heard a message from the multicast channel 418 about who is selected as the multicast representative for the given job ID 406 (GUID). If that timestamp is too old, then the second computing device 402b will send out a request asking who the multicast representative is.

If two computing devices 402 become aware of a multicast job at very close to the same time, they both may check their active multicast table before the multicast representative message 412 from the other machine has been received and processed. It is possible that both of these computing devices 402 will assume they are chosen because they both think they are the first one to check on the job ID 406.

If a computing device 402 that thinks it is selected as multicast representative ever receives a message from another computing device 402 that thinks it is multicast representative, the computing device 402 can immediately determine who should continue being multicast representative. The multicast service 416 creates a unique service GUID that it puts in all the multicast representative messages 412. When a computing device 402 detects that both itself and the sender of a multicast representative message 412 think they are multicast representative, the computing device 402 does a memory compare of the GUID in the multicast representative message 412 and its own service GUID. The GUID that compares larger (e.g., using memcmp) wins. If the GUID of the received the multicast representative message 412 wins, the receiving computing device 402 will change its state to not selected.

The computing device 402a designated as the multicast representative may download file data 414a. The file data 414a may be the files in the file list 410a that are to be downloaded by the computing devices 402a-b participating in the multicast session.

The multicast service 416a-b may be a means for the computing devices 402 to access the multicast session and download files that are being sent by the multicast representative. The multicast service 416a-b may also enable the computing devices 402a-b to send or receive the multicast representative message 412a-b that indicates which computing device 402a is acting as the multicast representative.

One example of self-organizing multicast may be a classroom that includes several computing devices 402a-b. A server 419 indicates the computing devices 402a-b are to receive Microsoft Office. A list of all the files to be downloaded is created by the server 419 and included in a file list 410c. The file list 410c includes a path and a hash value for each file in the file list 410c. The server 419 determines the priority of the downloading process should be based on efficiency of sources (e.g., multicast, peer, preferred server and original source). The server creates the job ID 406c for the file list 410c. The server 419 determines the multicast delay 408c should be long since there are a large of number of computing devices 402a-b that are going to receive the files in the file list 410c.

In one configuration, the server 419 may determine a multicast delay 408c that allows enough time for the server 419 to contact each computing device 402a-b that is part of the multicast process before the multicast delay 408c expires. The server 419 may order the computing devices 402a-b by IP address so the computing devices 402a-b on the same subnet will be contacted at nearly the same time. This method of determining the multicast delay 408c may allow the multicast delay 408c to be a shorter period of time. In another configuration, the server 419 may determine the multicast delay 408c regardless of the IP addresses and subnets of the computing devices 402a-b.

The server 419 sends the file list 410c, job ID 406c and multicast delay 408c to the computing devices 402a-b in the classroom. The first computing device 402a contacted by the server 419 determines that it becomes the multicast representative since the computing device 402a has not received a multicast representative message from another computing device 402b. The computing device 402a is now designated as the multicast representative and sends a multicast representative message 412a to the other computing devices 402b in the classroom. The computing devices 402b receive the multicast representative message 412b and are designated as multicast listeners.

During the multicast delay 408, the computing device 402a downloads the files included in the file list 410a. The computing devices 402b designated as multicast listeners wait for the file data 414a to be sent by the multicast representative. Upon expiration of the multicast delay 408, the multicast representative sends the file data 414a on the multicast channel 418. Once the multicast representative has finished sending the file data 414a over the multicast channel 418, the multicast representative sends a multicast complete message 407a to the other computing devices 402b. The computing devices 402b will then verify that all of the files included in the file list 410b were properly received. If the files were not properly received, the computing devices 402b will first attempt to obtain the files from a peer, then a preferred server and last the computing devices 402b will attempt to obtain the files from the original source. If the computing device 402a designated as the multicast representative fails, another computing device 402b may become the multicast representative and complete the multicast. The computing device 402b determines the computing device 402a designated as the multicast representative has failed when a timeout occurs.

Sending and receiving files via self-organizing multicast allows the computing devices 402a-b to continue the job even if the server 419 is no longer communicating with the computing device 402a-b.

Figure 5:
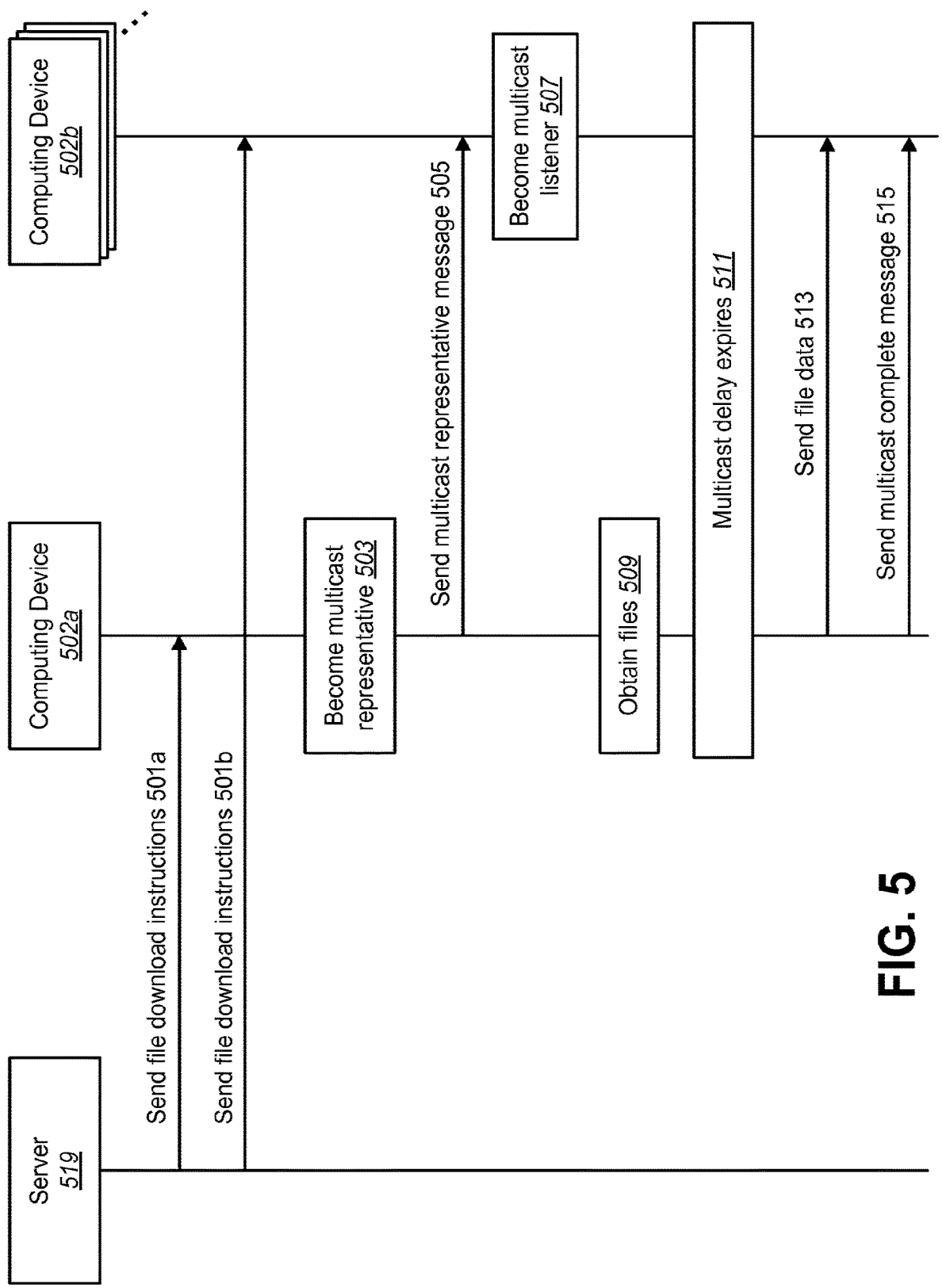
FIG. 5 is a call flow diagram illustrating one configuration of file downloading via self-organizing multicast.

FIG. 5 is a call flow diagram illustrating one configuration of file downloading via self-organizing multicast. In this example, there is a server 519 and computing devices 502a-b in communication. The computing devices 502a-b may be able to communicate using multicast operations.

The server 519 may send 501a-b file download instructions 405 to the computing devices 502a-b. The file download instructions 405 may include a job ID 406, a file list 410 and a multicast delay 408.

The computing device 502a may determine that it has not received a multicast representative message 412 from another computing device 502b and may become 503 the multicast representative. The computing device 502a may send 505 a multicast representative message 412 to the other computing devices 502b.

The other computing devices 502b may become 507 multicast listeners. The computing device 502a designated as the multicast representative may obtain 509 files for the file download job. The files may be listed in a file list 410 included in the file downloaded instructions 405 sent by the server 519. The computing devices 502a-b may wait for a multicast delay 408 to expire.

Upon expiration 511 of the multicast delay 408, the computing device 502a designated as the multicast representative may send 513 file data 414 to the other computing devices 502b designated as the multicast listeners. Once all of the files are sent by the computing device 502a participating in the software distribution job, the computing device 502a designated as the multicast representative may send 515 a multicast complete message 407 to the other computing devices 502b designated as the multicast listeners.

Figure 6A:
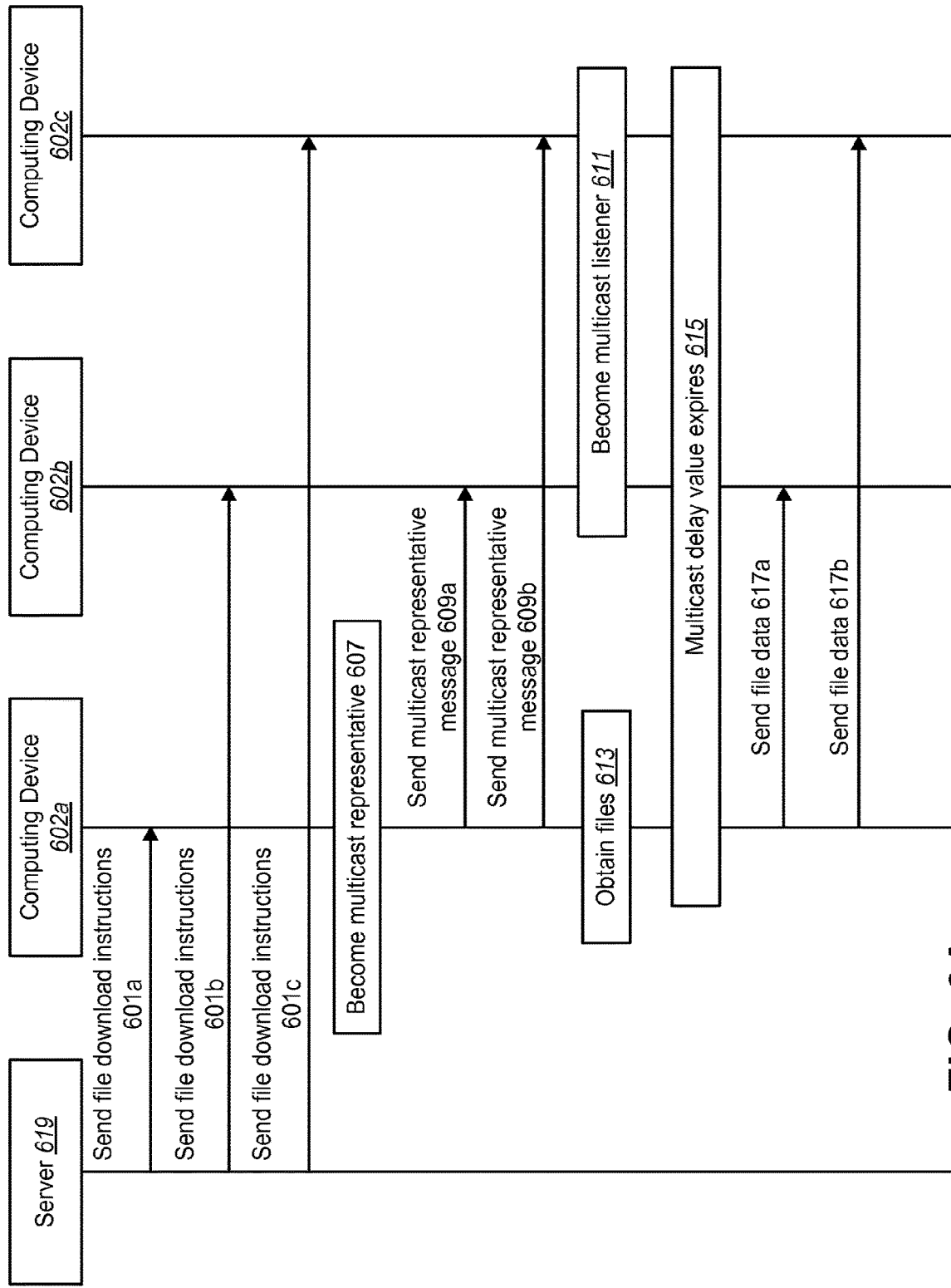
FIGS. 6A and 6B show a call flow diagram illustrating another configuration of file downloading via self-organizing multicast.
Figure 6B:
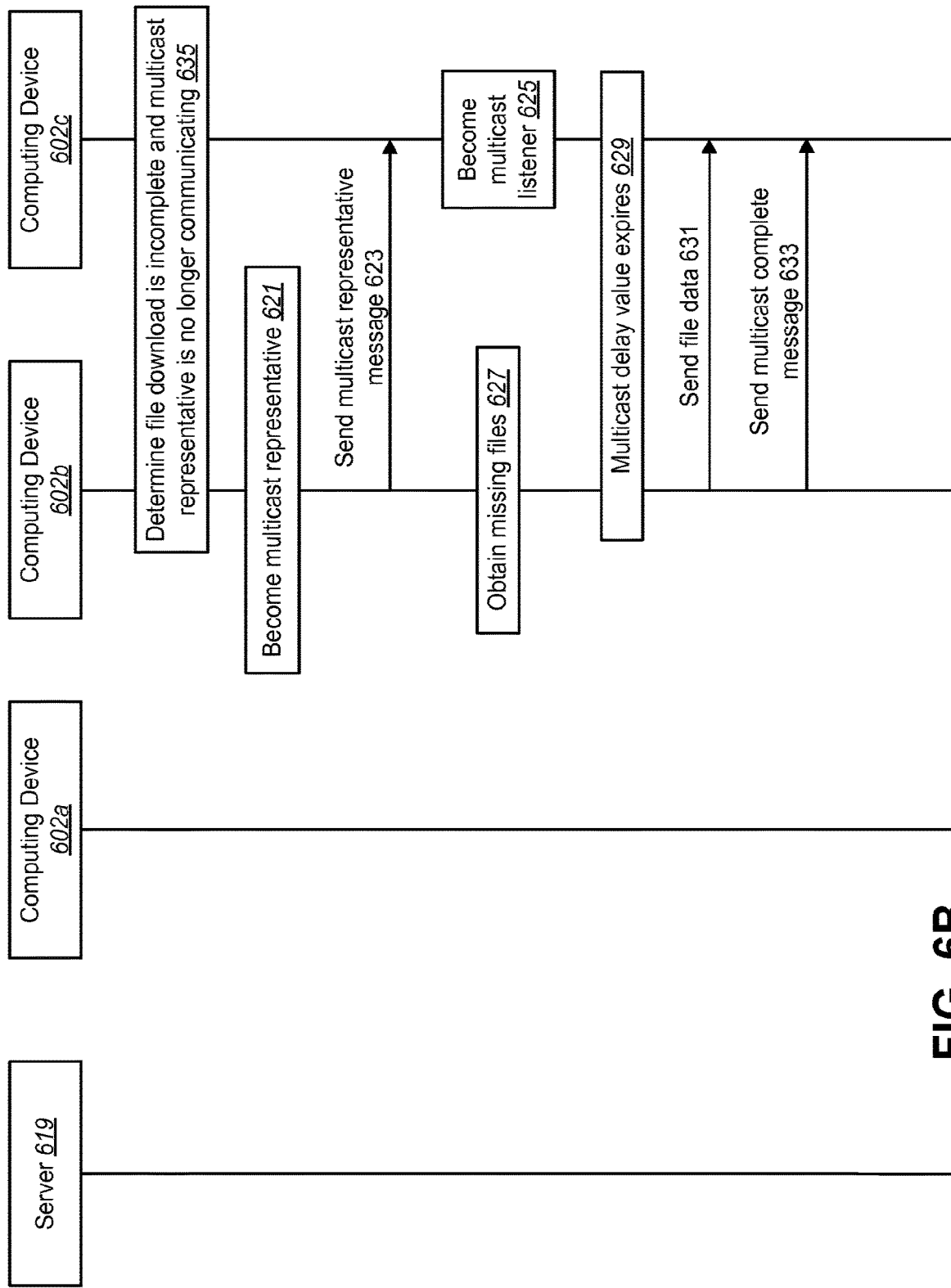

FIGS. 6A and 6B show a call flow diagram illustrating another configuration of file downloading via self-organizing multicast. In this example, there is a server 619 and three computing devices 602a-c in communication. The three computing devices 602a-c may be able to communicate using multicast operations.

Starting in FIG. 6A, the server 619 may send 601a-c file download instructions 405 to the computing devices 602a-c. The first computing device 602a to receive the file download instructions 405 may become 607 the multicast representative. The computing device 602a may send 609a-b a multicast representative message 412 to the other computing devices 602b-c. The other computing devices 602b-c may become 611 multicast listeners.

The computing device 602a designated as the multicast representative may obtain 613 files for the software distribution job. The computing devices 602a-c may wait for a multicast delay 408 to expire 615. The computing device 602a designated as the multicast representative may send 617a-b file data 414 to the other computing devices 602b-c designated as the multicast listeners.

Continuing on FIG. 6B, one or more of the computing devices 602b-c designated as the multicast listeners may determine 635 that the file download is incomplete and the computing device 602a designated as the multicast representative is no longer communicating. In this example, the computing device 602b may determine a timeout has occurred and may become 621 the multicast representative. The computing device 602b may send 623 a multicast representative message 412 to the other computing device 602c. The computing device 602c designated as a multicast listener may become 625 the multicast listener for the new multicast.

The computing device 602b (now designated as the multicast representative) may obtain 627 missing files that are included in the file list 410. The computing devices 602b-c may wait for the multicast delay 408 to expire 629. The computing device 602b designated as the multicast representative may send 631 file data 414 to the other computing device 602c designated as the multicast listener.

In one configuration, once all of the files are downloaded by the computing devices 602b-c participating in the software distribution job, the computing device 602b designated as the multicast representative may send 633 a multicast complete message 407 to the other computing device 602c designated as the multicast listeners. In another configuration, once all of the files are downloaded by the computing devices 602b-c participating in the software distribution job, the computing device 602b designated as the multicast representative will send 633 a multicast complete message 407 to the other computing device 602c designated as the multicast listeners.

Figure 7:
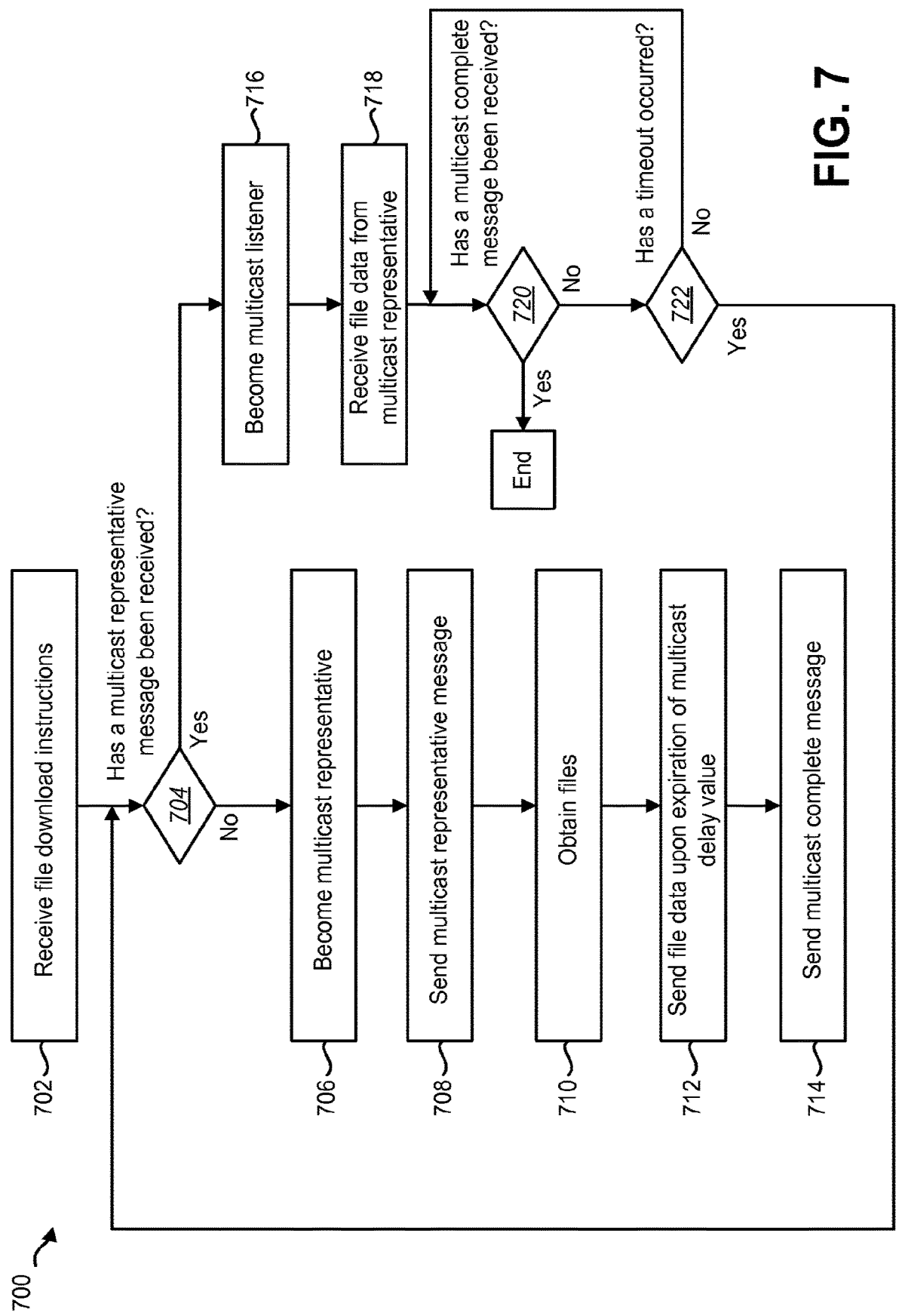
FIG. 7 is a flow diagram illustrating a method for file downloading via self-organizing multicast.

FIG. 7 is a flow diagram illustrating a method 700 for file downloading via self-organizing multicast. The method 700 may be performed by a computing device 402.

The computing device 402 may receive 702 file download instructions 405. For example, the computing device 402 may receive 702 the file download instructions 405 from a server 419.

In response to receiving the file download instructions 405, the computing device 402 may determine 704 if a multicast representative message 412 has been received. If the computing device 402 determines 704 that a multicast representative message 412 has not been received, then the computing device 402 may become 706 the multicast representative. Upon becoming the multicast representative, the computing device 402 may send 708 a multicast representative message 412.

The computing device 402 designated as the multicast representative may obtain 710 files to be downloaded by other computing devices 402 (e.g., multicast listeners). The computing device 402 may send 712 the file data 414 upon expiration of the multicast delay 408. Once all of the file data 414 is sent, the computing device 402 may send 714 a multicast complete message 407.

If the computing device 402 determines 704 that a multicast representative message 412 was received, the computing device 402 becomes 716 a multicast listener. Upon expiration of a multicast delay 408, the computing device 402 may receive 718 file data 414 from another computing device 402 designated as the multicast representative.

The computing device 402 designated as the multicast listener may determine 720 if a multicast complete message 407 has been received. If a multicast complete message 407 has been received, then the method 700 ends. If the computing device 402 determines 720 that a multicast complete message 407 has not been received, then the computing device 402 may determine 722 if a timeout has occurred.

If a timeout has not occurred, the computing device 402 may continue to determine 720 if a multicast complete message 407 has been received. If a timeout has occurred, then the computing device 402 may determine 704 if a multicast representative message 412 has been received in order to determine a new multicast representative for the file download job.

Figure 8:
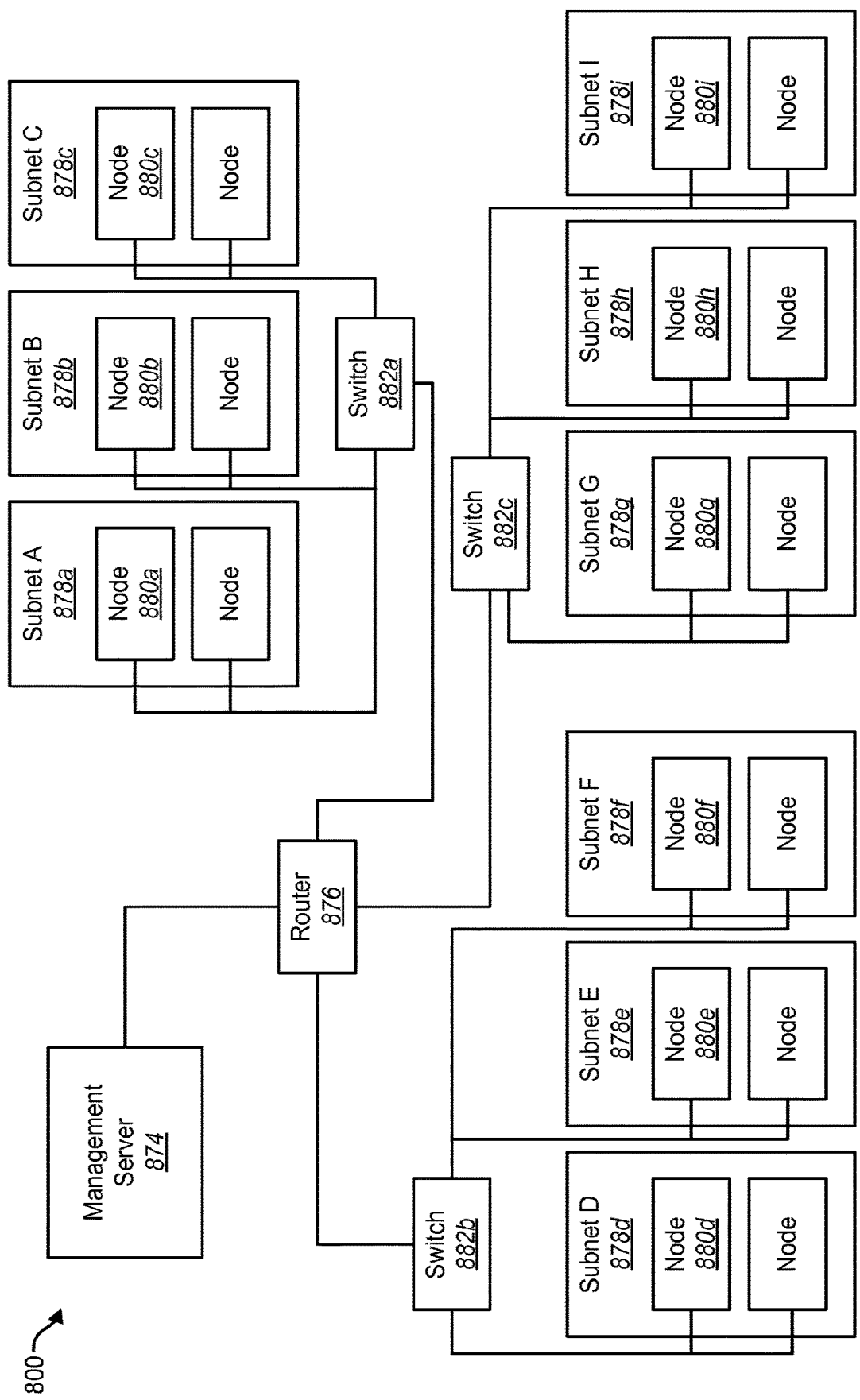
FIG. 8 is a block diagram that illustrates one configuration of a network where systems and methods self-organizing multicast may be implemented.

FIG. 8 is a block diagram that illustrates one configuration of a network 800 where systems and methods self-organizing multicast may be implemented. A management server 874 is connected to a router 876. The router 876 is connected to switches 882a, 882b, and 882c. The switch 882a is connected to several nodes 880a, 880b, 880c, etc., via their respective subnets 878a, 878b, and 878c. The switch 882b is connected to several nodes 880d, 880e, 880f, etc., via their respective subnets 878d, 878e, and 878f. The switch 882c is connected to several nodes 880g, 880h, 880i, etc., via their respective subnets 878g, 878h, 878i. Although FIG. 8 only shows one router 876, and a limited number of switches 882, subnets 878 and nodes 880, many and varied numbers of routers 876, switches 882, subnets 878 and nodes 880 may be included in networks and/or systems that may implement systems and methods for patch management. It should be noted that one or more of the nodes 880a-i may be examples of one or more of the computing devices 102, 402, 502 and 602 described herein.

Figure 9:
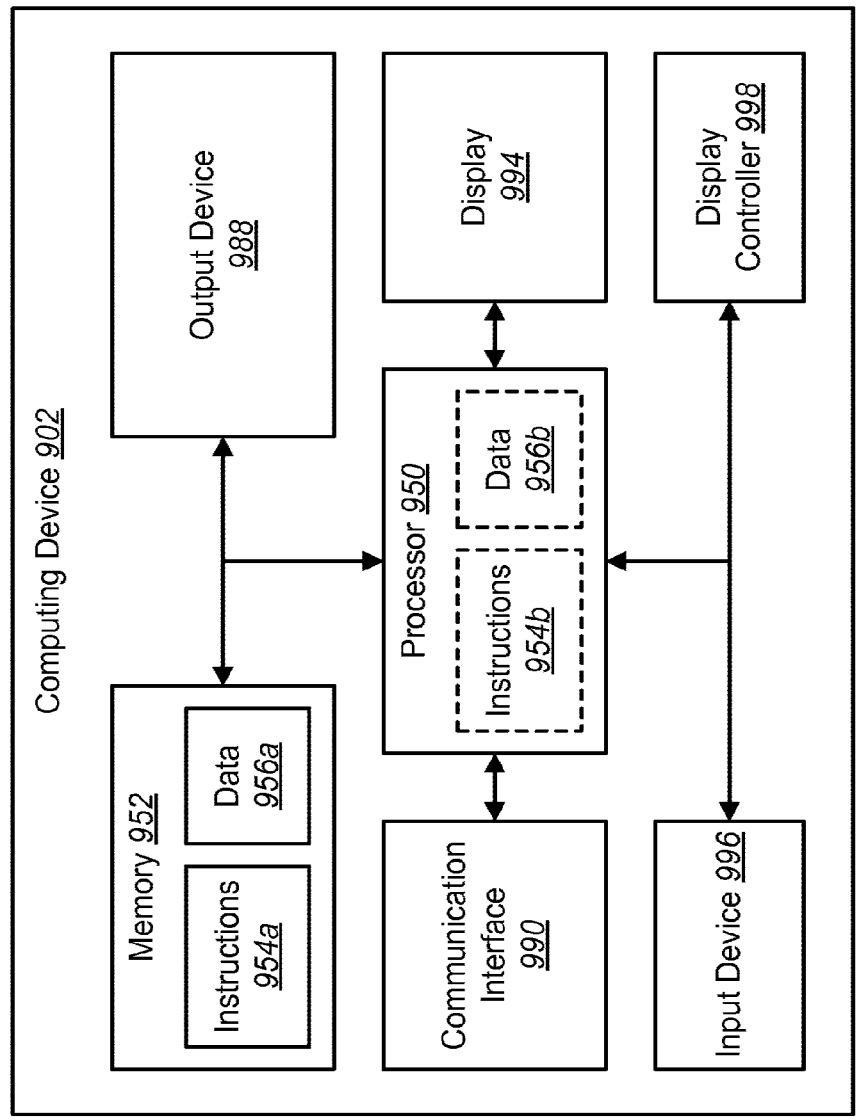
FIG. 9 illustrates various components that may be utilized in a computing device.

FIG. 9 illustrates various components that may be utilized in a computing device 902. The computing device 902 may be configured in accordance with one or more of the computing devices 102, 402, 502 and 602 described herein. The computing device 902 may include a processor 950 and memory 952. The memory 952 may include instructions 954a and data 956a. The processor 950 controls the operation of the computing device 902 and may be, for example, a microprocessor, a microcontroller, a digital signal processor (DSP) or other device known in the art. The processor 950 typically performs logical and arithmetic operations based on program instructions 954b and/or data 956b received from the memory 952.

The computing device 902 typically may include one or more communication interfaces 990 for communicating with other electronic devices. The communication interfaces 990 may be based on wired communication technology, wireless communication technology or both. Examples of different types of communication interfaces 990 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 902 typically may include one or more input devices 996 and one or more output devices 988.

Examples of different kinds of input devices 996 include a keyboard, mouse, microphone, remote control device, button, joystick, trackball, touchpad, lightpen, etc. Examples of different kinds of output devices 988 include a speaker, printer, etc. One specific type of output device that may be included in a computer system is a display device 994. Display devices 994 used with configurations disclosed herein may utilize any suitable image projection technology, such as liquid crystal display (LCD), light-emitting diode (LED), gas plasma, electroluminescence, a cathode ray tube (CRT) or the like.

A display controller 998 may also be provided, for converting data stored in the memory 952 into text, graphics and/or moving images (as appropriate) shown on the display device 994. Of course, FIG. 9 illustrates only one possible configuration of a computing device 902. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for file downloading by a first computing device of a plurality of computing devices coupled in a subnet via a multicast channel, the method comprising:

receiving, at the first computing device from a server device configured to at least partially manage the subnet, file download instructions to join a multicast session to download file data, wherein the file download instructions include a job ID that indicates that the plurality of computing devices are instructed to join a multicast to download certain files;

responsive to the first computing device receiving the file download instructions from the server device prior to receipt of a multicast message including the job ID from a second computing device in the subnet, sending a multicast representative message to other computing devices of the subnet on the multicast channel, wherein the multicast representative message indicates that the first computing device is a multicast representative for the job ID;

downloading, by the first computing device, the file data at least partially during a multicast delay from the server device, wherein the multicast delay indicates a length of time for the plurality of computing devices to join a multicast session of the file data;

upon expiration of the multicast delay, sending the file data on the multicast channel to other computing devices of the subnet; and sending, to the server device, a multicast complete message.

2. The method of claim 1, wherein:

the first computing device includes a table of active multicasts; and the receipt of the file download instructions from the server device prior to receipt of the multicast message from the second computing device in the subnet is indicated by no entry in the table for the job ID.

3. The method of claim 2, further comprising responsive to the no entry, changing a state of the first computing device to a discovery state.

4. The method of claim 1, wherein the multicast representative message is further configured to:

ask whether a third computing device of the subnet is acting as a multicast representative for a file data distribution identified by the job ID; and create an entry in an active multicast table of the third computing device showing a state of unknown or inactive responsive to the multicast representative message which causes the third computing device to reconfigure as a listening device.

5. The method of claim 1, wherein the multicast representative directs a file distribution of the file download instructions to the subnet in place of the server device.

6. The method of claim 1, wherein the file download instructions further comprise one or both of:

a file list that lists the file data to be distributed for the job ID; and an indication of the multicast delay.

7. The method of claim 1, wherein:

the subnet is a first subnet of a plurality of subnets included on a network, the file download instructions are also received by each computing device from a second plurality of computing devices on a second subnet of the plurality of subnets, and a third computing device from the second plurality of computing devices on the second subnet manages another self-organizing multicast session based on the file download instructions for the second subnet.

8. The method of claim 1, further comprising:

generating, at the first computing device, a globally unique identifier (GUID);

receiving, at the first computing device, a subsequent multicast representative message from a third computing device of the subnet;

comparing lengths of a GUID of the subsequent multicast representative message and the generated GUID of the first computing device; and based on the comparison, determining, by the first computing device, whether to designate the third computing device as the multicast representative.

9. One or more non-transitory computer-readable media having encoded therein programming code executable by one or more processors to perform or control performance of operations comprising:

receiving, from a server device configured to at least partially manage a subnet, file download instructions to join a multicast session to download file data, wherein the file download instructions include a job ID that indicates that a plurality of computing devices coupled in the subnet via a multicast channel are instructed to join a multicast to download certain files;

responsive to receiving the file download instructions from the server device prior to receipt of a multicast message including the job ID from a second computing device in the subnet, sending a multicast representative message to other computing devices of the subnet on the multicast channel, wherein the multicast representative message indicates that a first computing device is a multicast representative for the job ID;

downloading the file data at least partially during a multicast delay from the server device, wherein the multicast delay indicates a length of time for the plurality of computing devices to join a multicast session of the file data;

upon expiration of the multicast delay, sending the file data on the multicast channel to other computing devices of the subnet; and sending a multicast complete message to the server device.

10. The non-transitory computer-readable media of claim 9, wherein:

the first computing device includes a table of active multicasts; and the receipt of the file download instructions from the server device prior to receipt of the multicast message from the second computing device in the subnet is indicated by no entry in the table for the job ID.

11. The non-transitory computer-readable media of claim 10, wherein the operations further comprise changing a state of the first computing device to a discovery state responsive to the no entry.

12. The non-transitory computer-readable media of claim 9, wherein the multicast representative message is further configured to:

ask whether a third computing device of the subnet is acting as a multicast representative for a file data distribution identified by the job ID; and create an entry in an active multicast table of the third computing device showing a state of unknown or inactive responsive to the multicast representative message which causes the third computing device to reconfigure as a listening device.

13. The non-transitory computer-readable media of claim 9, wherein the multicast representative directs a file distribution of the file download instructions to the subnet in place of the server device.

14. The non-transitory computer-readable media of claim 9, wherein the file download instructions further comprise one or both of:

a file list that lists the file data to be distributed for the job ID; and an indication of the multicast delay.

15. The non-transitory computer-readable media of claim 9, wherein:

the subnet is a first subnet of a plurality of subnets included on a network, the file download instructions are also received by each computing device from a second plurality of computing devices on a second subnet of the plurality of subnets, and a third computing device from the second plurality of computing devices on the second subnet manages another self-organizing multicast session based on the file download instructions for the second subnet.

16. The non-transitory computer-readable media of claim 9, wherein the operations further comprise:

generating a globally unique identifier (GUID);

receiving a subsequent multicast representative message from a third computing device of the subnet;

comparing lengths of a GUID of the subsequent multicast representative message and the generated GUID of the first computing device; and based on the comparison, determining whether to designate the third computing device as the multicast representative.

* * * * *